Feb. 6, 1968          J. WITT          3,367,694
CONNECTING BOLT IN AN INSULATED JOINT
Filed Feb. 10, 1966
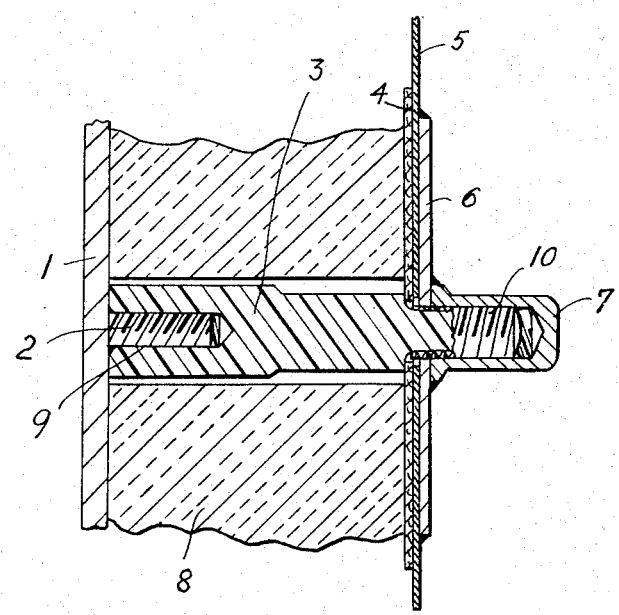
INVENTOR
Johannes Witt
By Lowry & Rinehart
ATTORNEYS

# United States Patent Office 3,367,694
Patented Feb. 6, 1968

3,367,694
CONNECTING BOLT IN AN INSULATED JOINT
Johannes Witt, Kiel-Dietrichsdorf, Germany, assignor to Kieler Howaldtswerke Aktiengesellschaft, Kiel-Dietrichsdorf, Germany, a firm
Filed Feb. 10, 1966, Ser. No. 526,504
Claims priority, application Germany, Feb. 15, 1965, K 50,347
1 Claim. (Cl. 287—189.36)

ABSTRACT OF THE DISCLOSURE

A connecting bolt assembly which comprises in combination a synthetic plastic bolt and a metal nut having a metal distributor disk. This assembly is adapted to externally support thin-walled tanks for liquid supercooled gases on ships as well as to take up all stresses from the wall of the tank (expansion and contraction) and the ship's movements in the sea (accelerative forces).

This invention relates to connecting bolts, and more specifically to a connecting bolt for externally supporting thin-walled tanks for liquid supercooled gases on ships, said tanks being provided with an outer insulation.

The tanks for liquid supercooled gases frequently consist of a plurality of troughlike component parts with expansion joints so that the relatively great differences in temperature between the normal temperature of the external surroundings and the boiling point of the gases can be taken up. The relatively large tanks, when they are only partly filled with liquid gas or completely emptied, tend to collapse since the walls of the tanks engage loosely the outer insulation in order to avoid cold bridges.

Summary of the invention

It is the object of the present invention to eliminate this shortcoming and to provide a support for tank walls while at the same time avoiding cold bridges.

This object is achieved according to the present invention by providing a connecting bolt for externally supporting thin-walled tanks for liquid supercooled gases on ships, said tanks being provided with an outer insulation, wherein the connecting bolt is made of an elastic insulating material, a tapped hole is formed in one of the ends of the connecting bolt for fixing the same to a bolt on a wall of a ship, and a thread is provided on the other end of the connecting bolt for carrying a nut with a distributor disk lying against the inner side of a wall of a tank, said distributor disk being weldable to said wall of said tank.

Brief description of the drawing

One embodiment of the invention will now be described by way of example and with reference to the accompanying drawing, in which the only figure is a longitudinal section through a connecting bolt according to the invention.

The method of assembling the different elements of the invention will be apparent from an inspection of the drawing and the following description, the connecting bolt 3 consisting of an elastic insulating material, such as e.g. polyamide, and having at one of its ends a tapped hole 9 by which it is screwed on an externally threaded wall bolt 2 on a wall 1 of a ship. The connecting bolt 3 supports the inner wall 5 of a tank and insulation 8 and takes up all stresses, such as torques, thermal tensile forces, vibrations and dead weights. The material of the connecting bolt 3 possesses the same insulating properties as the insulation 8 surrounding the connecting bolt. Moreover, the connecting bolt 3 is resistant to the media to be transported. At its inner end remote from the tapped hole 9, the connecting bolt 3 is provided with an external thread 10 onto which is screwed a nut 7 that is connected to a distributor disk 6. The nut 7 with the relatively large distributor disk 6 lies against the inner side of the wall 5 of the tank and the distributor disk 6 may be connected to the wall 5 of the tank by welding. Between the inner wall 5 of the tank and the insulation 8 as well as the connecting bolt 3 an asbestos plate 4 may be interposed.

The load resulting from the dead weight of the wall 5 of the tank and the weight of the insulation 8 is distributed by the distributor disk 6 over a large area. The distributor disk 6 also ensures that the tight weld 11 to be produced for joining the distributor disk to the wall of the tank is spaced from the connecting bolt 3 sensitive to heat.

As the connecting bolt 3 has a greater coefficient of thermal contraction than the nut 7, the torsional moments occurring in the wall 5 of the tank cannot be transmitted to the connecting bolt 3 owing to the existing heat dependent play.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description and all changes which come within the meaning and range of equivalency of the claim are therefore intended to be embraced therein.

I claim:

1. A connecting bolt assembly for externally supporting thin-walled tanks for liquid supercooled gases on ships, said tanks having inner and outer walls and being provided with insulation therebetween, the connecting bolt being of an elastic insulating material, a tapped hole formed in one of the ends of the connecting bolt, the wall of the ship constituting the outer wall of the tank, a bolt on the wall of the ship adapted to be received in the tapped hole in the elastic bolt of insulating material and the other end of the connecting bolt being threaded, a nut with a distributor disk lying against the inner side of the inner wall of the tank, an asbestos plate interposed between the distributor disk and the insulation and said distributor disk being welded to said inner wall of said tank in spaced relation to said connecting bolt.

References Cited

UNITED STATES PATENTS

| | | | |
|---|---|---|---|
| 2,159,221 | 5/1939 | Mills | 52 |
| 2,656,902 | 10/1953 | Gotshall | 52 |
| 3,069,962 | 12/1962 | Rapata | 85—8.8 |
| 3,238,835 | 3/1966 | Rosenberg | 85—7 |
| 3,285,635 | 11/1966 | Whelan | 287—20.92 |

FOREIGN PATENTS 248,327  12/1963  Australia.

MARION PARSONS, Jr., *Primary Examiner.*